S. KETTRIDGE.
PICTORIAL ACCOUNTING DEMONSTRATOR.
APPLICATION FILED AUG. 28, 1911.

1,033,806.

Patented July 30, 1912.

3 SHEETS—SHEET 1.

Fig. 1.

Witnesses
D. M. Offutt
H. B. Churn

Inventor
Sidney Kettridge
G. Ayres
Attorney

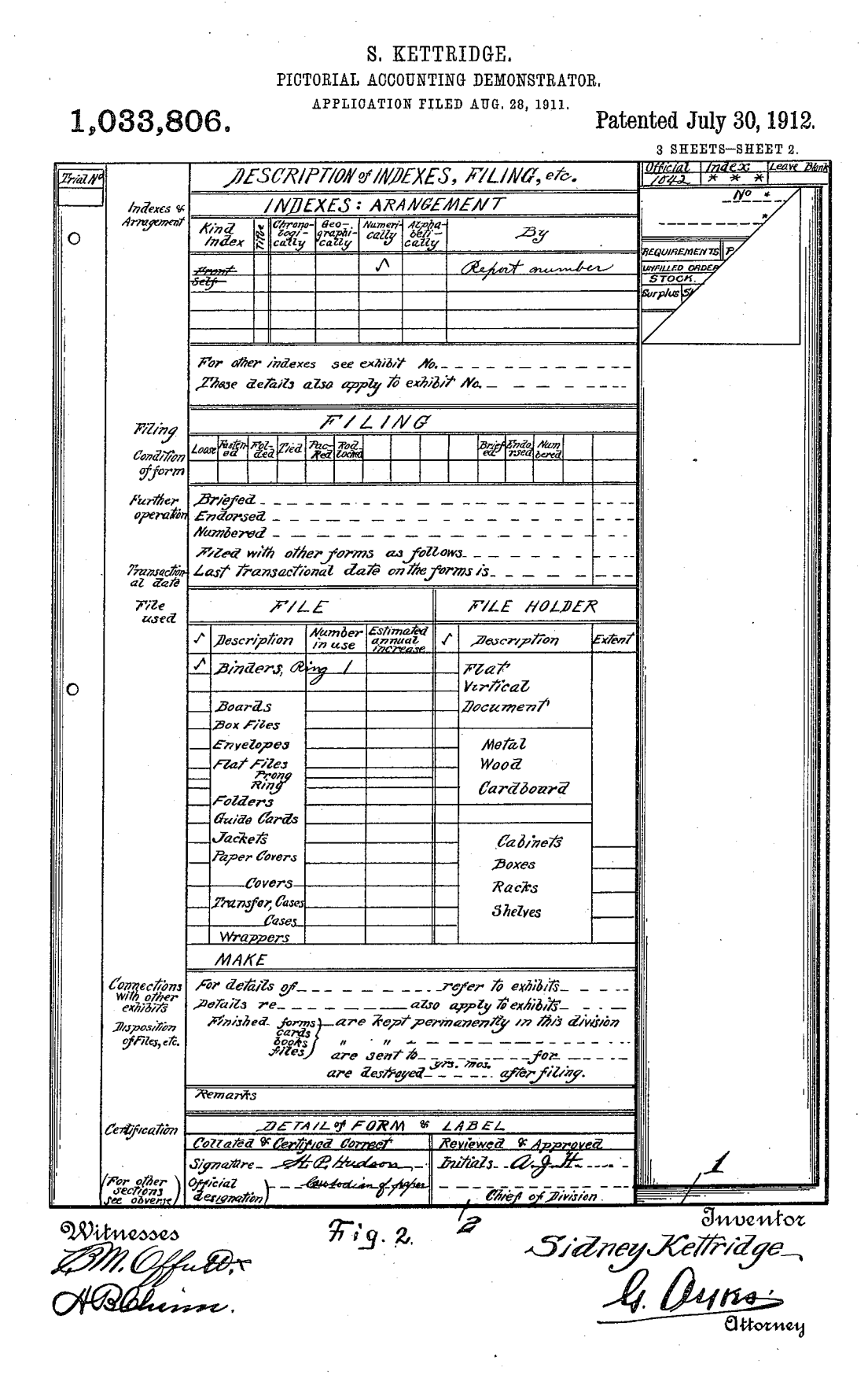

S. KETTRIDGE.
PICTORIAL ACCOUNTING DEMONSTRATOR.
APPLICATION FILED AUG. 28, 1911.

1,033,806.

Patented July 30, 1912.

3 SHEETS—SHEET 2.

Fig. 2.

Witnesses

Inventor
Sidney Kettridge
Attorney

S. KETTRIDGE.
PICTORIAL ACCOUNTING DEMONSTRATOR.
APPLICATION FILED AUG. 28, 1911.

1,033,806.

Patented July 30, 1912.

3 SHEETS—SHEET 3.

| Dept.* Division.* Form 1042 | | DAILY STOCK REPORT Internal Revenue PAPER Packages each 1000 sheets | | | | | | | | | Form N° | Official 1042 | Index * | Leave Blank N° * 191 |
|---|---|---|---|---|---|---|---|---|---|---|---|---|---|---|
| | | | | | | COMPARISON—BALANCE (STOCK ON HAND) with BUREAU REQUIREMENTS, | | | | | PROPOSED | | | |
| N° | Paper COLOR | SIZE | Balance on hand (initial) | Received From Mill | Issued to Bureau Engraving & Printing | Balance on hand (Final) | BUREAU REQUIREMENTS | | STOCK | | INCLUDING UNFILLED ORDERS STOCK | | ORDER TO MILL | REMARKS |
| | | | | | | | Daily Schedule | Schedule 30 Days | Surplus | Shortage | Balance Due from Mill | Surplus | Shortage | |
| 50 | B L U E | 10 x 16 | 4 | | | 4 | | | 4 | | | 4 | | |
| 51 | | 11¼ x 16 | 1273 | | | 1273 | 8 | 240 | 1033 | | | 1033 | | |
| 52 | | 11¾ x 16 | 445 | | | 445 | 3 | 90 | 355 | | | 355 | | |
| 53 | | 12 x 13½ | 133 | | | 133 | | | 133 | | | 133 | | |
| 54 | | 12 x 14½ | 256 | | 5 | 251 | 12 | 360 | | 109 | | | 109 | 150 |
| 55 | | 12½ x 14½ | 326 | | | 326 | | | 326 | | | 326 | | |
| 56 | | 12¾ x 16 | 34 | 33 | | 1 | 31 | 930 | | 929 | 500 | | 429 | 250 |
| 58 | | 13 x 16 | 151 | | | 151 | | | 151 | | | 151 | | |
| 59 | | 13¼ x 16 | 238 | | 15 | 223 | 1 | 30 | 193 | | | 193 | | |
| 63 | | 14½ x 16¼ | 104 | | | 104 | | | 104 | | | 104 | | |
| 64 | | 14½ x 16½ | 1341 | | 125 | 1216 | 125 | 3750 | | 2534 | 800 | | 1734 | 500 |
| 67 | | 15¼ x 16 | 370 | | 2 | 368 | | | 368 | | | 368 | | |
| 68 | | 15¼ x 19 | 217 | | | 217 | 2 | 60 | 157 | | | 157 | | |
| 69 | | 15½ x 16½ | 371 | | | 371 | 4 | 120 | 251 | | | 251 | | |
| 70 | | 15¾ x 16 | 127 | | | 127 | 4 | 120 | 7 | | | 7 | | |
| 75 | | 16 x 19 | 110 | | 8 | 102 | 7 | 210 | | 108 | 100 | | 8 | 100 |
| 78 | | 16½ x 17½ | 337 | | | 337 | 21 | 630 | | 293 | | | 293 | 300 |
| 80 | | 17½ x 19½ | 441 | | | 441 | | | 441 | | | 441 | | |
| 84 | | 18½ x 20¼ | 131 | | 5 | 126 | 5 | 150 | | 24 | | | 24 | |
| 85 | | 18¾ x 20¾ | 609 | | | 609 | 23 | 690 | | 81 | | | 81 | |
| 90 | W H I T E | 11¼ x 18 | 77 | | | 77 | 2 | 60 | 17 | | | 17 | | |
| 92 | | 13½ x 16¼ | 302 | | | 302 | 3 | 90 | 212 | | | 212 | | |
| 95 | | 14¼ x 18½ | 586 | | 12 | 574 | 12 | 360 | 214 | | | 214 | | |
| 97 | | 15¾ x 16¼ | 532 | | 5 | 527 | | | 527 | | | 527 | | |
| 99 | | 16 x 18½ | 77 | | | 77 | | | 77 | | | 77 | | |
| | | | | | | | | | 4570 | 4078 | | 4570 | 2678 | |
| | | | | | | | | | | 4078 | | | 2678 | |
| | | Total | 8592 | | 210 | 8382 | 263 | 7890 | Net 492 | | 1400 | 1892 | | 1300 |

H. P. Hudson
Custodian of Paper

Fig. 3.

Witnesses

Inventor
Sidney Kettridge
G. Ours
Attorney

UNITED STATES PATENT OFFICE.

SIDNEY KETTRIDGE, OF WASHINGTON, DISTRICT OF COLUMBIA.

PICTORIAL ACCOUNTING-DEMONSTRATOR.

1,033,806.

Specification of Letters Patent.

Patented July 30, 1912.

Application filed August 28, 1911. Serial No. 646,506.

*To all whom it may concern:*

Be it known that I, SIDNEY KETTRIDGE, a subject of the King of Great Britain, residing at Washington, District of Columbia, have invented certain new and useful Improvements in Pictorial Accounting-Demonstrators, of which the following is a specification.

My invention relates to improved means for obtaining fundamental information regarding Government work subjectively, and the cost of the accounting therefor, whereby records of the work and costs, and examples of method and system in each department, establishment, and institution, can be maintained and controlled by a central office for the general information and instruction of administrative officers, clerks, and others; and for providing data to facilitate investigative work, promoting economy and efficiency generally.

The object of my invention is to provide a pictorial accounting demonstrator, or novel pictorial accounting report or mount folder, containing, on a form-mount, the form exhibited, and, on a label-strip, certain details relative to such form, and being conveniently, though not necessarily, upon a single sheet and provided with suitable means for binding or assembling. The form-mount is adapted to have a form mounted thereon, and the label-strip is adapted to overlie such form. The label-strip has label imprints containing headings, columns, designated spaces, and the like, for entering data relating to the associated form.

Referring to the drawings, forming a part of this application: Figure 1 is a fragmentary view, illustrating my novel pictorial accounting demonstrator as a folder with obverse and reverse label imprints, such folder being in open or unfolded position, displaying the label obverse with part of the exhibited mounted form; Fig. 2 is a face view, showing the folder closed, displaying the label reverse, with the exhibited form also folded, and Fig. 3 is a fragmentary view, showing the exhibited mounted form.

In the drawings, reference 1 indicates the form-mount, combined with a mounted form, having a heading for entering an identification of such form by official form number and index references, said heading being shown at the upper right-hand corner, in position for display beyond the label-strip 2 in the folded position of the latter.

As shown in Fig. 1, the label obverse is provided with headings for official form and index numbers corresponding to those on the form mount 1, with headings for the organization or identification code symbol of the reporting division, etc., and with headings for classifying the mounted form subjectively, as indicated by reference numeral 3. The label obverse is also provided with headings 4 for stating the source and disposition or utilization of the information furnished by the form, with headings 5 for stating the steps required in preparing the form and the cost of such steps, and with additional headings for indicating the nature of the form and other data.

As shown in Fig. 2, the label reverse is provided with headings relative to indexing and filing the mounted form.

In Fig. 3, the mounted form or blank is shown with specimen entries exemplifying its functions.

In Figs. 1 and 2, the labels are illustrated with entries, showing the manner in which the headings are used to record data regarding the particular form exhibited.

As shown in the figures the label-strip and the form-mount are on one sheet, and the label-strip has obverse and reverse label imprints. It will be obvious, however, that the labels can be used in a detached manner as separate reports, either placed next to the illustrated form or in other convenient position; further, that the labels can be imprinted on one face only, instead of obverse and reverse.

The completed individual mount folders or reports for each department or establishment, when collated subjectively, will serve as a current pictorial accounting demonstrator of Government work and system; further, by duly recording changes in system when such occur, the reports will continue as an up-to-date picture of such work. These pictorial exhibits can be maintained either in a central office for each department, or in a central office for all departments and establishments.

It will be evident that my pictorial accounting demonstrators are not limited to Government use, but can be readily adapted to private or public business concerns, establishments, institutions, etc.

I claim—

1. A mount-folder for forms, comprising a sheet folded over to provide a form-mount and a label-strip, suitably adapted for binding or assembling, said label-strip being of less area than the form-mount; said label-strip having the obverse and reverse of a label printed on its opposite faces, the obverse of such label being on the face of said label-strip which is exposed for inspection in conjunction with the mounted form when the mount-folder is unfolded or open; the reverse of said label being on the face of said label-strip exposed for inspection when the mount-folder is folded or closed; said labels containing headings for entering a description of loose forms and book forms, and of blanks used for accounting and for recording and reporting transactions and statistics and for imparting information and instructions; and containing headings for identification with the particular form with which said label-strip is associated; and said label-strip being adapted to overlie said form-mount; said form-mount being adapted to have a form mounted thereon, the said form being the subject of the information entered on the label-strip; and said form-mount being provided with headings for entering official form number and index references, duplicating those on the label obverse, and in position for display beyond the edge of said label-strip in the folded position of the latter: the obverse of said label-strip containing headings, columns, and designated spaces for identifying the mounted form by official form number and index references; for classifying the form subjectively; for stating the source, utilization and disposition of the information furnished by such form; for stating the steps required in preparing and using the form mounted and the cost of such steps; and the reverse of said label-strip containing headings for data relative to indexing and filing the mounted form, substantially as described.

2. In combination, a label-strip and a form-mount; said label-strip having label imprints, and containing headings for entering a description of loose forms and book forms, and of blanks used for accounting and for recording and reporting transactions and statistics and for imparting information and instructions; and containing headings for identification with the particular form with which said label-strip is associated; said label-strip being adapted to overlie such form: said form-mount being adapted to have a form mounted thereon, the said form being the subject of the information entered on the label-strip, and having headings for entering the official form number and index references corresponding with those entered on the label, said headings extending beyond the label-strip and being in position for display when the label-strip overlies the form: said label-strip containing headings, columns, and designated spaces for identifying the associated form by entering official form number and index references; for classifying the form subjectively; for stating the source, utilization and disposition of the information furnished by the form; for stating the steps required in preparing and using the form and the cost of such steps; and for stating the manner of indexing and filing the form, substantially as described.

3. A mount-folder for forms, comprising a sheet folded over to provide a label-strip and a form-mount: said label-strip having label imprints, and containing headings for entering a description of loose forms and book forms, and of blanks used for accounting and for recording and reporting transactions and statistics and for imparting information and instructions; and containing headings for identification with the particular form with which said label-strip is associated; said label-strip being adapted to overlie such form: said form-mount being adapted to have a form mounted thereon, the said form being the subject of the information entered on the label-strip, and having headings for entering the official form number and index references corresponding with those entered on the label, said headings extending beyond the label-strip and being in position for display when the label-strip overlies the form: said label-strip containing headings, columns, and designated spaces for identifying the associated form by entering official form number and index references; for classifying the form subjectively; for stating the source, utilization and disposition of the information furnished by the form; for stating the steps required in preparing and using the form and the cost of such steps; and for stating the manner of indexing and filing the form, substantially as described.

4. A mount-folder for forms, comprising a sheet folded over to provide a label-strip and a form-mount, said form-mount being in combination with a form, marked with form number and index references; said label-strip having label imprints, and containing headings for entering a description of loose forms and book forms, and of blanks used for accounting and for recording and reporting transactions and statistics and for imparting information and instructions; and containing headings for identification with the particular form with which said label-strip is associated; said label-strip being adapted to overlie such form: said form-mount being adapted to have a form mounted thereon, the said form being the subject of the information entered on the label-strip, and having headings for entering the official form number and index references corresponding with those entered on the label, said headings extending beyond the label-strip and being in position for display when the label-strip overlies the form: said label-strip containing headings, columns, and designated spaces for identifying the associated form by entering official form number and index references; for classifying the form subjectively; for stating the source, utilization and disposition of the information furnished by the form; for stating the steps required in preparing and using the form and the cost of such steps; and for stating the manner of indexing and filing the form, substantially as described.

In testimony whereof I affix my signature in presence of two witnesses.

SIDNEY KETTRIDGE.

Witnesses:
G. AYRES,
F. H. RIDGWAY.